Jan. 3, 1950 A. R. APPLEGARTH, JR 2,493,517

BLOCKING OSCILLATOR

Filed July 24, 1942

Inventor:-
Alexander R. Applegarth Jr.
by his Attorneys
Howson & Howson

Patented Jan. 3, 1950

2,493,517

UNITED STATES PATENT OFFICE 2,493,517

BLOCKING OSCILLATOR

Alexander R. Applegarth, Jr., Dayton, Ohio

Application July 24, 1942, Serial No. 452,252

4 Claims. (Cl. 250—36)

This invention relates generally to electrical systems designed to be actuated or set in operation periodically by recurrent pulse signals supplied thereto. The invention relates to various improvements in such circuits, and more specifically to a method of and means for increasing the tendency of such a system to be actuated by desired pulse signals occurring with a given period, and for decreasing the tendency of the system to be actuated by undesired pulses and extraneous noise signals occurring in the intervals between said desired pulse signals. The invention is particularly adapted for use in a television system, for example in the deflecting circuits thereof, and in various types of frequency dividers synchronized by periodically recurrent pulse signals. However, it is to be understood that the invention is not restricted in its application to any particular system.

In the television art, it is often desirable to generate relatively large pulse signals timed by periodically recurrent, accurately spaced but relatively small pulses which are conveniently referred to as "synchronizing pulses." Various devices for this purpose are known, examples of which are the blocking tube oscillator, gas discharge tube oscillators, multivibrators, and the like. Such devices have the advantage that, in the absence of synchronizing pulses, they will continue to oscillate at a rate which is usually somewhat lower than that at which they oscillate when synchronized. A device of this type possesses the added desirable feature that it is more readily actuated by a pulse signal during certain parts of its cycle than during other parts thereof. This tends to insure the actuation of the device only by certain desired periodically recurrent pulses, and not by other pulses occurring periodically or at random or by noise pulses. However, it has been found that, although these devices are less susceptible to actuation during certain portions of their periods than during others, the difference in susceptibility to actuation in different parts of the cycle, and the rate of transition from low susceptibility to high susceptibility, are not sufficiently great to insure that the device will not be actuated by an undesired pulse or signal.

Devices of the above character have also been used as frequency dividers but have proven unsaisfactory where a large division is sought, due to their tendency to respond to other than the desired subharmonic of the signal whose frequency is divided.

The principal object of the present invention is to provide in such a device novel means for increasing the difference in susceptibility to actuation as between different parts of the cycle and for emphasizing the transition between low and high susceptibility.

Figure 1:
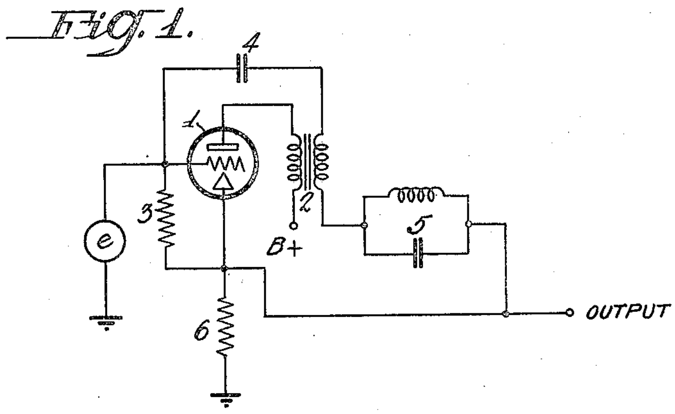
Figure 2:
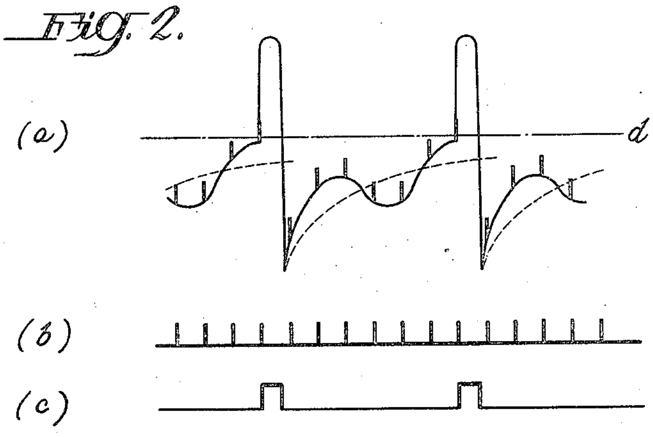
Figure 3:
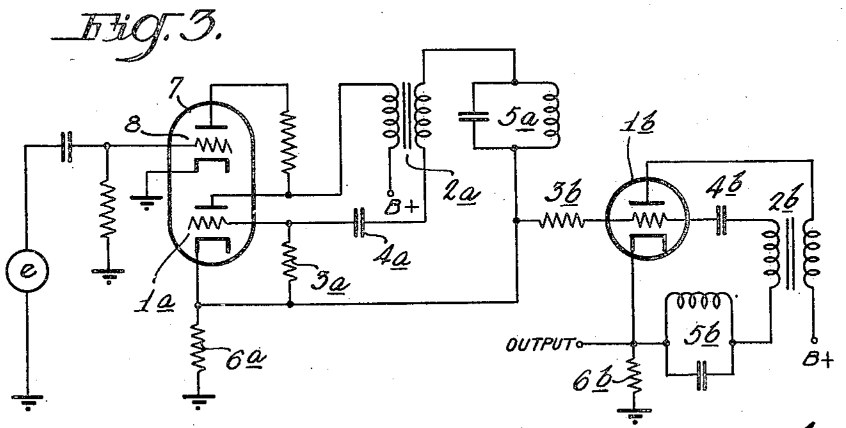

The invention may be clearly understood by reference to the accompanying drawing, in which Fig. 1 is a diagram of a blocking-oscillator embodying the invention;

Fig. 2 is an explanatory diagram which will facilitate an understanding of the device; and Fig. 3 illustrates a multi-stage frequency divider circuit embodying the invention.

Referring first to Fig. 1, there is shown a blocking-oscillator comprising a tube 1, a transformer 2, and a time circuit consisting of the resistor 3 and the condenser 4. Disregarding for the moment the other elements in the system, the operation of such a device is as follows:

In its quiescent condition, the grid of the tube 1 is biased beyond cut-off by a voltage in the time circuit which leaks off gradually until the grid voltage is such that the tube is no longer blocked, at which time the plate will start to draw current. The increase in the plate current will induce a voltage in the grid circuit by means of the transformer 2 which will cause the plate to draw more current. As a result, the plate current and grid voltage will increase rapidly until the grid draws current and charges the condenser 4. The voltage across the condenser will oppose that developed in the secondary of the transformer, with the result that grid voltage and plate current will finally decrease rapidly until the only voltage applied to the grid will be that due to the charge on the condenser. This voltage will be negative with respect to the cathode and of sufficient magnitude to bias the tube beyond cut-off. The tube is then inactive until this bias has been sufficiently reduced to permit the tube to conduct, which may obtain either by the discharge of the condenser through the resistor 3 or by the application of an opposing voltage from some external source.

With the device adjusted to oscillate freely with a period which may be greater by several times than the interval between pulses applied to synchronize it, it may be made to begin a new cycle in response to each of these timing pulses. However, if noise pulses or other extraneous signals be introduced in the intervals between the desired timing pulses, they may tend to actuate the device and thereby falsely synchronize it. This is particularly the case where the oscillator is used in the capacity of a frequency divider.

For example, given a series of time-spaced pulse signals occurring at a predetermined frequency, it may be desirable to have the oscillator respond to only certain of these pulses occurring with a period equal to a multiple of the interval between successive pulses. By proper adjustment of the oscillator and with sufficient uniformity in the size and shape of the pulses, the device may be made to respond to every other pulse, to every third pulse, etc. But, as the number of pulses intervening between those which it is desired should fire the oscillator is increased, the operation of the oscillator becomes unstable due to its tendency to fire on other than the desired pulses. In order to avoid this, it has been found desirable to "quench" the oscillator during the interval between the occurrence of pulses which it is desired should actuate it. By quenching the oscillator is meant that, during the period of quenching, the oscillator is rendered less susceptible to actuation by pulse signals and the like than it would be ordinarily. Quenching may be effected, for example, by applying to the oscillator a voltage of polarity opposite to that which would tend to fire it.

By the present invention, there is provided a novel means for quenching the oscillator, as shown in Fig. 1. A resonant circuit 5 is included in the grid return circuit of the oscillator so as to produce a sinusoidal voltage wave having a predetermined frequency relation to the frequency of occurrence of the desired pulses. This voltage wave combines with the pulse signals in a manner to effect the desired quenching.

For purposes of explanation, let it be assumed that it is desired to use the oscillator as a frequency divider, and that a frequency division of seven is desired. In Fig. 2 at (a) the normal exponential decay of negative grid voltage which is typical of the operation of the usual form of blocking-oscillator is represented by broken lines. Since the susceptibility of the oscillator to firing is dependent upon grid voltage, it is apparent that as the grid voltage decays and approaches the firing level d, the susceptibility of the oscillator to firing increases greatly, while the flattening of the decay curve is such that the oscillator is capable of exercising very little discrimination as between desired and undesired pulses. The effect of including the resonant circuit in the grid return is to add to the normal grid voltage a sine-wave voltage so phased that premature firing is rendered virtually impossible. The resonant circuit is excited at the beginning of each cycle of oscillation by the grid of the tube drawing a pulse of current. When the grid current ceases the resonant circuit 5 oscillates freely and substantially independently of the rest of the circuit until it is again excited by the initiation of a new cycle. The period of the resonant circuit 5 is so chosen that a positive peak of oscillation corresponds substantially to the time of occurrence of the pulse which it is desired should fire the oscillator. The effect upon the grid voltage is clearly shown in Fig. 2 at (a) where the modified grid voltage curve is represented by the solid line. At (b) there is shown the series of time spaced pulse signals which are applied to the grid of the oscillator from the source e and which are to be subjected to frequency division, for example by seven. As shown in Fig. 2 at (a) these pulses will ride on the grid voltage wave and, when one rises above the level d the oscillator will fire. The effect of adding the sine-wave voltage is to increase the rate of change of grid voltage just before the arrival of the seventh pulse after the beginning of each oscillation. This increase in steepness of the grid voltage curve greatly increases the tendency of the oscillator to fire on the seventh pulse, while relatively decreasing the tendency of the oscillator to fire on the sixth pulse. In the resulting output signal derived, for convenience, across the load resistor 6 in the cathode of the tube, and shown in Fig. 2 at (c) there will be one pulse for every seventh pulse in the input signal.

The considerations involved in the choice of the resonant frequency of the circuit 5 will be apparent from the foregoing discussion. In the embodiment just described, the resonant frequency of this circuit was made approximately one and one-third times the frequency at which it was desired that the device should oscillate. However, it will be understood that, in all cases, there will be a number of frequencies to which this circuit might be tuned to give satisfactory results, so long as the ultimate effect is to cause the oscillator to synchronize on the desired subharmonic. It may also be observed that although it is generally desirable to use a resonant circuit having as high a value of Q as is conveniently possible, satisfactory results are obtained even with relatively low Q circuits inasmuch as the circuit, as in the above case, may be required to oscillate freely for only slightly more than one cycle. It will be apparent that the advantages of applying the invention to frequency dividers in general are independent of the degree of division although, of course, the greater the degree, the greater will be the need for its application.

Another important application of the invention is its use in connection with cathode ray tube beam deflecting circuits such, for example, as are used in television. Sometimes these circuits employ oscillators similar to that just described for the purpose of producing large pulse signals in response to the relatively small synchronizing pulses. The disturbance of the oscillator produced by extraneous pulse signals and noise voltages tends to disrupt the operation of the deflecting circuit and thereby impairs reception of the television signal. In particular, the standard television synchronizing signal now in use includes, in addition to the usual horizontal and vertical synchronizing pulses, a series of so-called double horizontal frequency pulses which are inserted before and after the vertical synchronizing pulses for the intended purpose of improving vertical synchronization and for maintaining horizontal synchronization during the vertical blanking period. Unfortunately, however, the alternate double frequency pulses, which occur between those which are intended to maintain horizontal synchronization, have a decided disturbing effect upon the horizontal deflecting system so that steps must be taken to exclude them. By applying the present invention to any of the usual forms of deflecting circuits it is possible to eliminate these undesired double frequency pulses as well as other extraneous pulses, so as effectively to prevent them from disturbing the operation of the deflecting system.

It will be understood, of course, that the resonant frequency of the resonant circuit 5 will be chosen in any case according to the desired operation and application of the invention.

In Fig. 3 there is illustrated a multi-stage frequency divider circuit embodying the invention, The lower section 1a of the duo triode tube 7 is part of a blocking-oscillator comprising elements 2a, 3a, 4a, 5a and 6a which correspond to the similar elements of Fig. 1. In this instance, however, the triode 1a has signal impulses supplied to its plate or anode from the upper triode section 8 of the tube 7, the latter triode section having impulses supplied to its grid from source e. By virtue of the action of the resonant circuit 5a the frequency of the signal impulses supplied to the blocking-oscillator is divided, e. g. by seven, as described above with reference to Fig. 1.

The signal across resistor 6a is supplied to a second frequency divider stage including the tube 1b, transformer 2b, resistor 3b, condenser 4b, resonant circuit 5b, and output resistor 6b. This second stage effects a further frequency division, e. g. by seven. In an experimental embodiment of the two-stage circuit a signal frequency of 2940 cycles was reduced to 60 cycles, there being a frequency division by seven in each stage.

Although the invention has been described with reference to the illustrated embodiments, it will be understood that it is not thus limited but is capable of various modifications within the scope of the appended claims.

I claim:

1. In an electrical system employing time-spaced pulse signals: a blocking tube oscillator comprising a vacuum tube having at least a cathode, a grid and an anode, transformer means for regeneratively coupling the grid-cathode and anode-cathode circuits of said tube, a grid-leak grid-condenser combination connected in the grid-cathode circuit of said tube, said blocking tube oscillator being actuated by desired pulses but being subject to actuation by undesired pulses; means energized by said blocking tube oscillator for producing a sinusoidal voltage wave having a predetermined frequency relation to the frequency of occurrence of said desired pulses; and means for utilizing said voltage wave to decrease the responsiveness of said oscillator to the undesired pulses.

2. In an electrical system employing time-spaced pulse signals: a blocking tube oscillator comprising a vacuum tube having at least a cathode, a grid and an anode, transformer means for regeneratively coupling the grid-cathode and anode-cathode circuits of said tube, a grid-leak grid condenser combination connected in the grid-cathode circuit of said tube, said blocking tube oscillator being actuated by desired pulses but being subject to actuation by undesired pulses; a resonant circuit energized by pulses of current developed by said blocking tube oscillator to produce a sinusoidal voltage wave having a predetermined frequency relation to the frequency of occurrence of said desired pulses; and means for utilizing said voltage wave to decrease the responsiveness of said oscillator to the undesired pulses.

3. In an electrical system employing time-spaced pulse signals: a blocking tube oscillator comprising a vacuum tube having at least a cathode, a grid and an anode, transformer means for regeneratively coupling the grid-cathode and anode-cathode circuits of said tube, a grid-leak grid-condenser combination connected in the grid-cathode circuit of said tube, said blocking tube oscillator being responsive to pulses exceeding a predetermined amplitude level; means energized by said blocking tube oscillator for producing a sinusoidal voltage wave at least some of whose peaks occur in substantial coincidence with the desired pulses; and means for combining said voltage wave with said pulse signals thereby to raise the desired pulses above said amplitude level and to lower the undesired pulses below said amplitude level.

4. In an electrical system employing time-spaced pulse signals: a blocking tube oscillator comprising a vacuum tube having at least a cathode, a grid and an anode, transformer means for regeneratively coupling the grid-cathode and anode-cathode circuits of said tube, a grid-leak grid-condenser combination connected in the grid-cathode circuit of said tube, said blocking tube oscillator being actuated by desired pulses but being subject to actuation by undesired pulses; and a resonant circuit connected in the grid-cathode circuit of said tube for producing a sinusoidal voltage wave having a predetermined frequency relation to the frequency of occurrence of said desired pulses so as to decrease the responsiveness of said oscillator to the undesired pulses.

ALEXANDER R. APPLEGARTH, JR.

REFERENCES CITED

The following references are of record in the file of this patent:

UNITED STATES PATENTS

| Number | Name | Date |
|---|---|---|
| 1,999,378 | Tolson | Apr. 30, 1935 |
| 2,141,343 | Campbell | Dec. 27, 1938 |
| 2,235,131 | Wheeler | Mar. 18, 1941 |
| 2,255,403 | Wheeler | Sept. 9, 1941 |
| 2,277,000 | Bingley | Mar. 17, 1942 |
| 2,288,554 | Smith, Jr. | June 30, 1942 |
| 2,416,424 | Wilson | Feb. 25, 1947 |